US012507021B2

(12) United States Patent
Wiinberg et al.

(10) Patent No.: US 12,507,021 B2
(45) Date of Patent: Dec. 23, 2025

(54) METHOD OF SUPPRESSING ACOUSTIC FEEDBACK IN A BINAURAL HEARING AID SYSTEM

(71) Applicant: Widex A/S, Lynge (DK)

(72) Inventors: Alan Wiinberg, Fredensborg (DK); David Pelegrin-Garcia, Copenhagen (DK); Craig Mitchell, Hvidovre (DK)

(73) Assignee: Widex A/S, Lynge (DK)

( * ) Notice: Subject to any disclaimer, the term of this patent is extended or adjusted under 35 U.S.C. 154(b) by 306 days.

(21) Appl. No.: 18/037,906

(22) PCT Filed: Nov. 3, 2021

(86) PCT No.: PCT/EP2021/080454
§ 371 (c)(1),
(2) Date: May 19, 2023

(87) PCT Pub. No.: WO2022/106196
PCT Pub. Date: May 27, 2022

(65) Prior Publication Data

US 2024/0007801 A1 Jan. 4, 2024

(30) Foreign Application Priority Data

Nov. 20, 2020 (DK) ............................. PA202001317

(51) Int. Cl.
*H04R 25/00* (2006.01)

(52) U.S. Cl.
CPC ......... *H04R 25/453* (2013.01); *H04R 25/552* (2013.01)

(58) Field of Classification Search
CPC ..... H04R 25/00; H04R 25/453; H04R 25/552
See application file for complete search history.

(56) References Cited

U.S. PATENT DOCUMENTS 4,783,818 A * 11/1988 Graupe .................... H03G 3/32 381/83
5,680,467 A 10/1997 Hansen

FOREIGN PATENT DOCUMENTS

EP 2 613 566 A1 7/2013
EP 2 621 198 A2 7/2013

* cited by examiner

*Primary Examiner* — Suhan Ni
(74) *Attorney, Agent, or Firm* — Sughrue Mion, PLLC

(57) ABSTRACT

A binaural hearing aid system comprising a first hearing aid (200) and a second hearing aid, with improved adaptive feedback suppression based on probe noise signals and a method (300) of operating such a binaural hearing aid system.

12 Claims, 3 Drawing Sheets

METHOD OF SUPPRESSING ACOUSTIC FEEDBACK IN A BINAURAL HEARING AID SYSTEM

CROSS REFERENCE TO RELATED APPLICATIONS

This application is a National Stage of International Application No. PCT/EP2021/080454 filed Nov. 3, 2021, claiming priority based on Danish Patent Application No. PA202001317 filed Nov. 20, 2020.

FIELD OF THE INVENTION

The present invention relates to binaural hearing aid systems. The invention more particularly relates to binaural hearing aid systems that rely on adaptive feedback suppression in order to reduce the problems caused by acoustic feedback. The invention also relates to methods of suppressing acoustic feedback in binaural hearing aid systems.

BACKGROUND OF THE INVENTION

Within the context of the present disclosure a hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor adapted to provide amplification in those parts of the audible frequency range where the user suffers a hearing deficit, and an acoustic output transducer. The signal processor is preferably a digital signal processor. The hearing aid is enclosed in a casing suitable for fitting behind or in a human ear.

Within the present context a hearing aid system may comprise a single hearing aid (a so called monaural hearing aid system) or comprise two hearing aids, one for each ear of the hearing aid user (a so called binaural hearing aid system). Furthermore, the hearing aid system may comprise an external device, such as a smart phone having software applications adapted to interact with other devices of the hearing aid system. Thus, within the present context the term "hearing aid system device" may denote a hearing aid or an external device.

Generally a hearing aid system according to the invention is understood as meaning any system which provides an output signal that can be perceived as an acoustic signal by a user or contributes to providing such an output signal and which has means which are used to compensate for an individual hearing loss of the user or contribute to compensating for the hearing loss of the user. These systems may comprise hearing aids which can be worn on the body or on the head, in particular on—or in the ear, and can be fully or partially implanted. However, some devices whose main aim is not to compensate for a hearing loss may nevertheless be considered a hearing aid system, for example consumer electronic devices (such as headsets) provided they have measures for compensating for an individual hearing loss.

Acoustic feedback from a receiver to one or more microphones will limit the maximum amplification that can be applied in a hearing aid. Due to the feedback, the amplification in the hearing aid can cause resonances, which shape the spectrum of the output of the hearing aid in undesired ways and even worse, it can cause the hearing aid to become unstable, resulting in whistling or howling. The hearing aid usually employs compression to compensate hearing loss; that is, the amplification gain is reduced with increasing sound pressures. Moreover, an automatic gain control is commonly used on the output to limit the output level, thereby avoiding clipping of the signal. In case of instability, these compression effects will eventually make the system marginally stable, thus producing a howl or whistle of nearly constant sound level.

Feedback suppression is often used in hearing aids to compensate the acoustic feedback. The acoustic feedback path can change dramatically over time as a consequence of, for example, amount of earwax, the user wearing a hat or holding a telephone to the ear or the user is chewing or yawning. For this reason it is customary to apply an adaptation mechanism on the feedback suppression to account for the time-variations.

One widely used method for feedback suppression in hearing aid systems is based on adaptive feedback cancellation. Reference is therefore first given to FIG. 1 which illustrates highly schematically a hearing aid 100, according to the prior art, comprising means for adaptive feedback cancellation. The hearing aid 100 comprises at least one acoustical-electrical input transducer 101 providing an input signal 106 (which in the following may also be denoted microphone signal y(n)), a digital signal processor 102 (which in the following may also be denoted hearing aid processor) providing an output signal 111 (which in the following may also be denoted loudspeaker signal u(n)), an electrical-acoustical output transducer 103, an adaptive feedback filter 104 and an adaptive feedback estimator 105.

Acoustic feedback occurs when part of the loudspeaker signal is picked up by a microphone creating an acoustic closed loop. A closed loop system becomes unstable when a magnitude of a signal traveling around the loop does not decrease for each round trip, and the feedback signal adds up in phase with a microphone signal. Hence, feedback limits the maximum stable gain achievable, it deteriorates the sound quality by producing a distortion of an incoming signal and can cause howling when the system becomes unstable.

Feedback problems can be reduced by adaptive feedback cancellation techniques that attempt to model a feedback path response h(n) using the adaptive feedback estimator 105 and the adaptive feedback filter 104 and subtract a modeled feedback signal $\hat{v}(n)$ (which in the following may be denoted feedback cancellation signal 109) provided by the adaptive feedback filter 104 from the microphone signal 106 (y(n)).

In FIG. 1, the adaptive feedback filter 104 provides an estimate $\hat{h}(n)$ of the true acoustic feedback path response h(n). Ideally, $\hat{h}(n)=h(n)$ and the feedback cancellation signal 109 ($\hat{v}(n)$) will hereby be identical to the true feedback signal 108 (v(n)). This implies that a residual signal 110 (e(n)) after subtraction of the feedback cancellation signal 109 ($\hat{v}(n)$) from the microphone signal 106 (y(n)) will only contain the incoming signal 107 (x(n)) without feedback, i.e. e(n)=x(n).

One of the main challenges in using adaptive filters for acoustic feedback cancellation is the biased estimation of $\hat{h}(n)$. It can be shown that the bias is given by a cross correlation vector E [u(n)x(n)] between the output signal 111 (u(n)) and the incoming signal 107 (x(n)). Hence, correlation between the output signal 111 and the incoming signal 107 biases the estimation of $\hat{h}(n)$, and thereby leads to a reduced feedback cancellation performance and may cause the cancellation system to fail and howling to occur.

Different techniques have been suggested to reduce the biased estimation problem. Techniques that de-correlate signals (e.g. using pre-whitening techniques) in the adaptive estimation path usually do not ensure a sufficiently good and reliable feedback cancellation performance. This is especially the case when the incoming signal is tonal and hence highly correlated. Additionally, or alternatively the feedback cancellation performance can be improved by de-correlating the loudspeaker signal relative to the microphone signal, e.g. by means of frequency shifting or phase shifting. Generally, e.g. frequency shifting significantly improves the feedback cancellation performance. However, this comes at the price of added delay to the main signal path and audible artefacts caused especially by the interference between directly transmitted sound and the frequency shifted sound in the ear canal.

Document U.S. Pat. No. 5,680,467 describes a hearing aid with digital, electronic compensation for acoustic feedback, wherein the hearing aid includes a microphone, a preamplifier, a digital compensation circuit and output amplifier and a transducer. The digital compensation circuit includes a noise generator for the insertion of noise, and an adjustable, digital filter for the adaptation of the feedback signal. The adaptation takes place using a correlation circuit which includes a digital circuit to carry out a statistical evaluation of the filter coefficients in the correlation circuit and changes the feedback function in accordance with this evaluation.

Although probe noise techniques are known in the art, there is still a need to improve the performance of such probe noise based feedback cancellation systems due to a number of disadvantages that make these techniques less applicable, First, the probe noise level is preferably such that it is completely masked by the original output signal, and thus, inaudible for the listener. This, in turn, means that the probe noise level needs to be—very low compared to the input signal, leading to a low "probe noise interference ratio" and consequently resulting in a larger variance on the feedback path estimate and/or a longer adaptation time. Thus, interference in this context refers to a desired target signal impinging on the microphone e.g. speech/audio etc.

The present invention therefore aims to overcome at least these drawbacks and provide a binaural hearing aid system with improved adaptive feedback cancellation white maintaining high sound quality.

Another aim of the present invention is to provide a method of operating a binaural hearing aid system and a computer readable medium both providing improved feedback cancellation while maintaining high sound quality.

SUMMARY OF THE INVENTION

The present invention provides a novel probe noise approach which can be used to provide a more unbiased estimation of the feedback path without compromising sound quality.

The invention, in a first aspect, provides a binaural hearing aid system with improved acoustic feedback suppression according to claim 1.

This provides a binaural hearing aid system with improved sound quality.

The invention, in a second aspect, provides a method of suppressing acoustic feedback in a binaural hearing aid system according to claim 10.

This provides an improved method of suppressing acoustic feedback while maintaining a high sound quality in a binaural hearing aid system.

According to a third aspect a non-transitory computer-readable medium which comprises instructions to carry out the steps of the above mentioned method is provided.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

It is noted that in the present context the terms acoustical and audio may be used interchangeably. The same is true with the respect to the terms adaptive feedback filter and adaptive feedback suppression filter.

Figure 1:
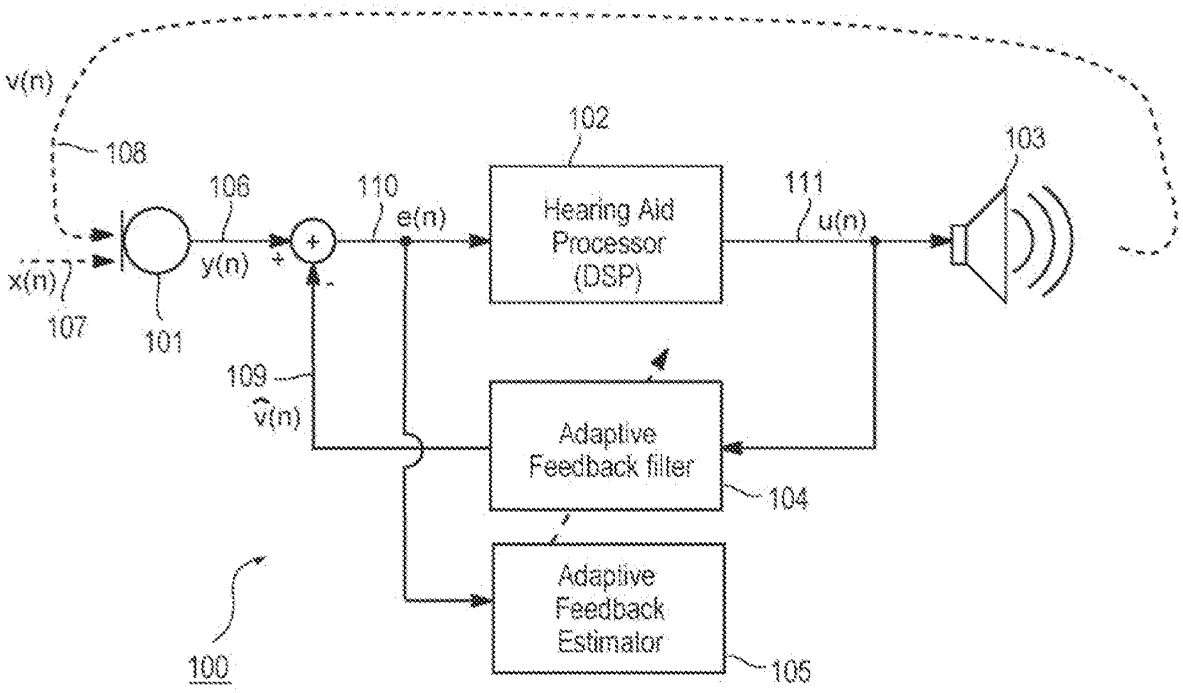
FIG. 1 illustrates highly schematically a hearing aid with adaptive feedback cancellation according to the prior art.
Figure 2:
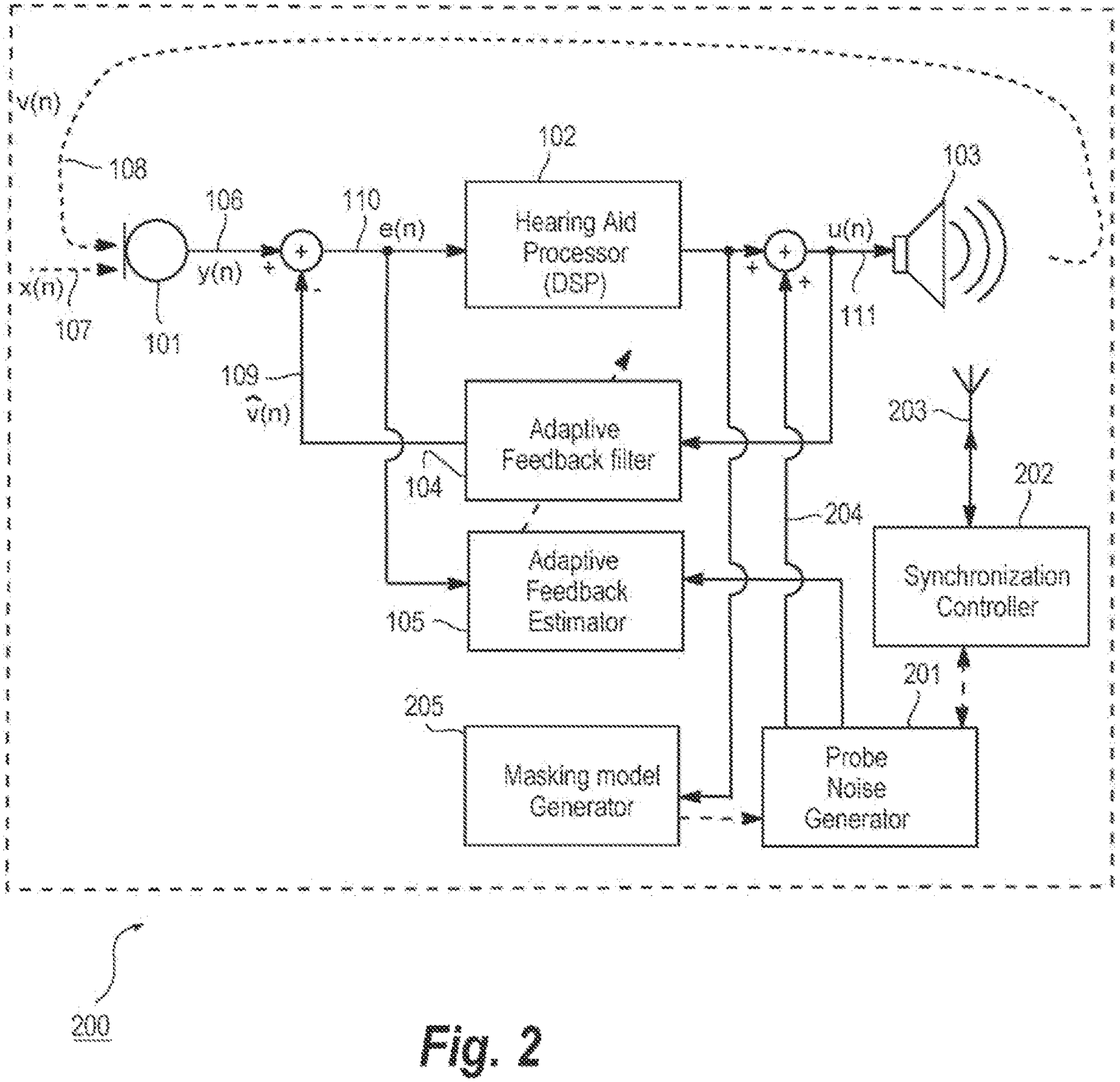
FIG. 2 illustrates highly schematically a hearing aid of a binaural hearing aid system according to an embodiment of the invention.

Reference is now given to FIG. 2, which illustrates highly schematically a hearing aid (200) of a binaural hearing aid system according to an embodiment of the invention, FIG. 2 is based on FIG. 1 and most of the reference numbers have therefore not been changed. However, FIG. 2 differs from FIG. 1 in comprising a probe noise generator 201, a synchronization controller 202 adapted to ensure that the probe noise generator 201 is synchronized with the probe noise generator of the other hearing aid of the binaural hearing aid system, an antenna 203 configured to provide a wireless link between the two hearing aids of the binaural hearing aid system and a masking model generator 203 configured to assist the probe noise generator 201 in generating a non-audible probe noise signal.

A probe noise signal 204 is generated by the probe noise generator 201 and provided both as input to the adaptive feedback estimator 105 and to be combined with the output signal from the hearing aid processor 102 (which in the following may also be denoted the processed residual signal) and hereby forming the input signal 111 to the output transducer 103, wherein the output transducer input signal 111 is likewise provided as input to the adaptive feedback filter 104. As in FIG. 1 the output signal from the adaptive feedback filter 104 is subtracted from the microphone signal 106 and hereby providing the residual signal 110.

According to the present embodiment the synchronization of the two probe noise generators comprises that the same signal (i.e. a diotic signal) is provided from the two probe noise generators accommodated respectively in the first and in the second hearing aid of the binaural hearing aid system.

The inventors have found that the full benefit of a synchronized probe noise generation can be estimated to occur if the relative mistiming between the provided probe noise signals is less than 150 μs. For a delay of around 300 μs there is a noticeable degradation, and for delays above 600 μs there is no benefit over independent (i.e. uncorrelated) noise generation. Thus the synchronization also comprises that the two probe noise generators provide signals that are synchronized (in time) to an accuracy of at least 300 μs and preferably less than 150 μs.

The inventors have found that by providing a diotic probe noise signal a higher probe noise signal, level can be provided without decreasing the sound quality because the combined probe noise signals are less audible.

More specifically it has been found that in case the processed residual signal from each of the two hearing aids of the binaural hearing aid is a diotic signal, which may e.g. be provided by many binaural hearing aid systems with binaural beam forming, the probe noise signal level must—in order to avoid a sound quality degradation audible probe noise signal)—be decreased with say 6 dB if providing an uncorrelated as opposed to a diotic probe noise signal.

It is further noted that something similar to a diotic processed residual signal may result when the hearing aid system user herself speaks or is listening to a person positioned directly in front of and not too far from the user or if the hearing aid system user is listening to streamed mono audio.

According to the present embodiment the probe noise signal 204 is generated by adaptively shaping a white noise sequence by a time-varying spectral shaping filter which is designed to provide perceptual masking (which in following may simply be denoted masking) The perceptual masking of the probe noise signal 204 is carried out by using the masking model generator 205 for providing a masking model output signal. The masking model output signal is used by the probe noise generator 201 to control the time-varying spectral shaping filter when generating the probe noise signal (204).

According to a more specific embodiment the white noise sequence is a Maximum Length Sequence.

However, generally any pseudo-random sequence generator can be used to provide a noise sequence based also on a seed that controls the state of the noise sequence and hereby enables that two identical noise sequences can be provided.

According to the present embodiment the diotic signal is provided by ensuring that the seed signal for the generation of the white noise sequence is the same and that the input from the masking model to the probe noise generator is likewise the same.

According to the present embodiment the probe noise generator is preferably configured to shape the white-noise sequence based on an average of the masking model output signals from the two hearing aids of the binaural hearing aid system, whereby synchronization of the probe noise signals from the two hearing aids of the binaural hearing aid system can be achieved.

However, according to alternative embodiments either of the masking model output signals provided by the two hearing aids of the binaural hearing aid system may be selected, based on some criteria or according to yet other alternative embodiments a signal derived from the two masking model output signals may be used.

According to the present embodiment the synchronization of the two noise generators is carried out using a synchronization controller configured to synchronize the probe noise generator of the first hearing aid with the corresponding probe noise generator of the second hearing aid by using a wireless connection between the first and the second hearing aid of the binaural hearing aid system.

However, according to one alternative embodiment the synchronization is carried out based on a wired connection between the two hearing aids and according to another alternative embodiment the synchronization is controlled by an external device, such as a smart phone or a remote control, that is wirelessly connected with the two hearing aid of the binaural hearing aid system.

According to an alternative embodiment only the white noise sequence is synchronized. More specifically this is provided by ensuring that the seed signal for the generation of the white noise sequence is the same in the two hearing aids and likewise synchronized in time as discussed above.

Hereby, probe noise signal level can be optimized with respect to the hearing loss for the associated ear and in a similar manner can the probe noise frequency shape be optimized with respect to the sound environment at the associated ear.

The inventors have found that despite the fact that the probe noise signals don't provide a diotic stimulation the probe noise signals are still advantageous with respect to lower audibility compared to similar probe noise signals that are not synchronized at all.

Considering e.g. a binaural hearing aid system with an external device, it follows that neither of the two hearing aids need neither a masking model generator nor a probe signal generator because the probe noise signal may be generated in the external device and streamed to the hearing aids.

According to another embodiment neither of the two hearing aids comprise a synchronization controller if synchronized probe noise signals or signals adapted to control the probe noise generators are streamed from an external device.

According to the present embodiment both hearing aids comprises a synchronization controller, a masking model generator and a probe signal generator, but according to an alternative embodiment one hearing aid operates as master and the other as slave and in such a configuration at least one of the synchronization controller, the masking model generator and the probe noise generator may be dispensed with in one of the hearing aids.

However, in a master and slave configuration the hearing aid without the means for determining the desired probe noise signal to be provided includes instead, according to an embodiment, a filter that compensates for the difference in amplification between the two hearing aids of the binaural hearing aid system. According to a more specific embodiment the filter is a minimum phase filter whereby the resulting mistiming between the two hearing aids can be minimized. However, according to yet another alternative embodiment the mistiming can be alleviated by delaying both the probe noise signal with an amount equal to or greater than the delay induced by the minimum phase filter and the transmission time delay between the two hearing aids, Whereby the probe noise signals can be synchronized in time.

According to the present embodiment the masking model generator 205 is adapted to provide inter ilia estimates of spectral (simultaneous) masking as well as estimates of temporal (forward) masking based on the processed residual signal. The masking model generator 205 is furthermore adapted to operate in the time domain using a gammatone filter bank. The gammatone filter bank is especially advantageous for the present invention because it can mimic some important properties of the peripheral auditory system, such as auditory filter bandwidth and roll-off.

Other non-linear filter banks, such as dynamic compressive gammachirp, dynamic gammawarp, dual-resonance nonlinear or multi-bandpass nonlinear filter banks may resemble closer some of the non-linear properties of the auditory system, but their computational load is much higher than the gammatone filter bank.

According to a variation of the present embodiment the masking model generator 205 comprises a spectral broadening post-processing block adapted to mimic a level-dependent broadening of the auditory filters. More specifically this post-processing may include a transformation of an input masking spectrum (in dB) into linear units, followed by application of two first-order ail-pole filters to the spectrum sequence, one in upward (increasing frequency index) direction and the other one in downward (decreasing frequency index) direction. A scale coefficient to the input values in the filters is set to 1 and subsequently the maximum output from the two filters is selected and is transformed back into the dB scale, whereby the level dependent broadening of the input masking spectrum is provided.

According to a less preferred variation of the present embodiment the masking model generator 205 is omitted, since probe noise based feedback cancellation for a binaural hearing aid system will still benefit from synchronized probe noise even if the probe noise is not adapted to be perceptually masked.

According to another (not illustrated) variation of the present embodiment, the adaptive feedback estimation path comprises at least one enhancement filter adapted to improve feedback cancelling performance by suppressing the estimation bias even for very low probe noise interference ratios and hereby decreasing the variance on the feedback path estimate and/or providing a shorter adaptation time. It is a specific advantage of the present invention that it may easily be combined with enhancement filter approaches tor additional performance improvement.

It is noted that the adaptive feedback suppression filter 104 according to the invention can be implemented in a hearing aid in several different ways. For example, it can be IIR, FIR or a combination of the two. It can be composed of a combination of a fixed filter and an adaptive filter. In a similar manner the adaptation mechanism can be implemented in several different ways, for example algorithms based on Least Mean Squares (LMS), Normalized Least Mean Squares (NLMS) or Recursive Least Squares (RLS).

It is also noted that the hearing aids of the binaural hearing aid system according to an obvious variation may comprise more than a single microphone.

Figure 3:
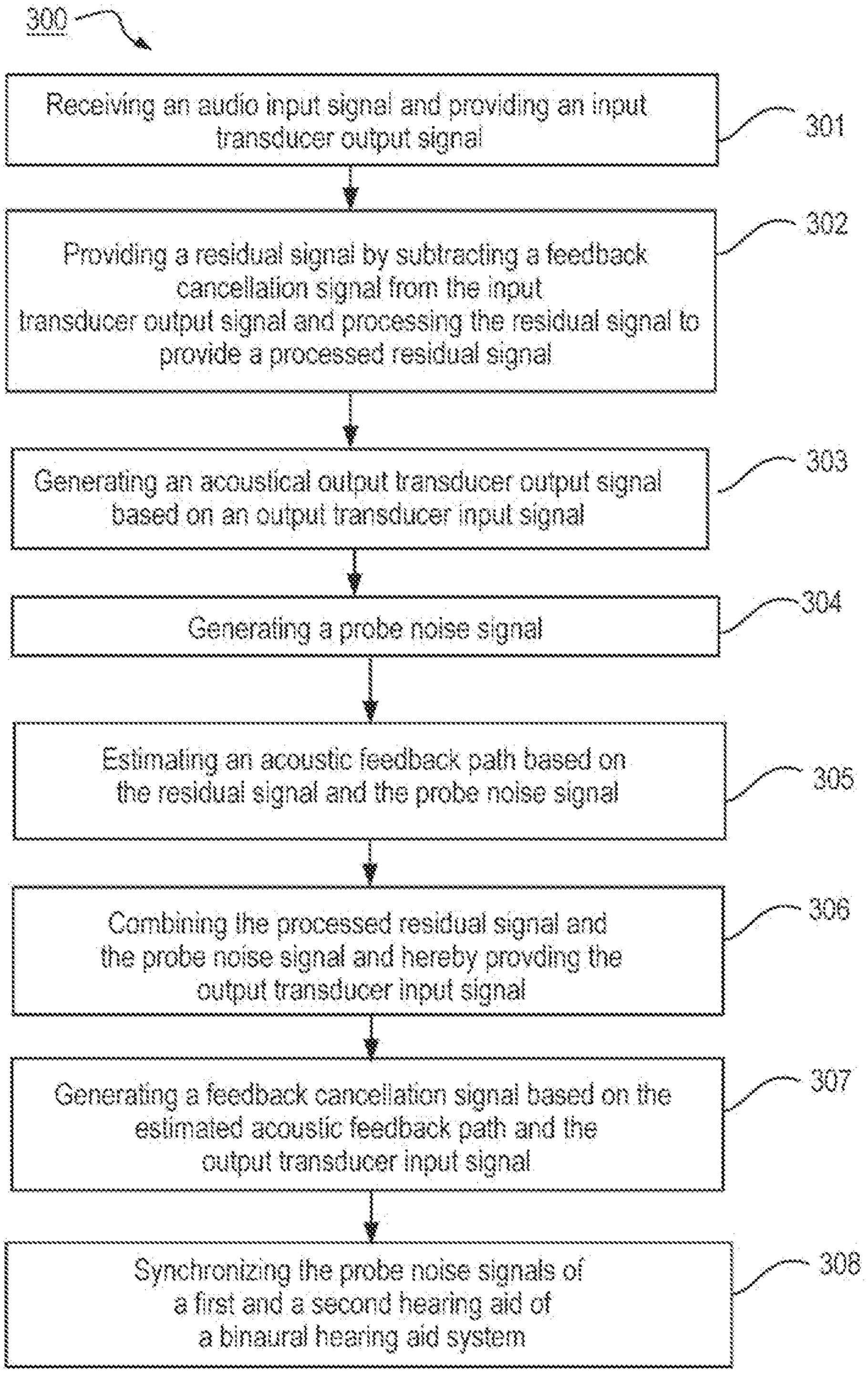
FIG. 3 illustrates highly schematically a method of suppressing acoustic feedback according to an embodiment of the invention.

Reference is now made to FIG. 3, which illustrates highly schematically a flow diagram of a method 300 of suppressing acoustic feedback in a binaural hearing aid system comprising a first hearing aid and a second hearing aid. A processor can execute instructions on a non-transitory computer-readable medium to carry out the method.

In a first step 301 an audio input signal is received and an input transducer output signal is provided.

In a second step 302, a residual signal is processed to generate a processed residual signal, wherein the residual signal is provided by subtracting a feedback cancellation signal from the input transducer output signal.

In a third step 303, an audio output transducer output signal is generated based on an output transducer input signal.

In a fourth step 304, a probe noise signal is generated.

In a fifth step 305, an acoustic feedback path is estimated by an adaptive feedback estimator based on the residual signal and the probe noise signal.

In a sixth step 306, the processed residual signal is combined with the probe noise signal and hereby providing the output transducer input signal to the electrical-acoustical output transducer.

In a seventh step 307, the output transducer input signal is received by an adaptive feedback suppression filter that subsequently generates the feedback cancellation signal based on the estimated acoustic feedback path.

In an eighth and final step 308, the probe noise signal of the first hearing aid is synchronized with the probe noise signal of the second hearing aid.

It is generally noted that even though many features of the present invention are disclosed in embodiments comprising other features then this does not imply that these features by necessity need to be combined.

As one example the synchronization of the probe noise signals may generally be based on using the signals or values configured to control the probe noise generator of both hearing aids by either applying an average of the two signals or values or applying either of the two signals or values or applying a measure derived from the two signals or values, but whether one or the other method is applied is generally independent of e.g. the specific masking model applied and also independent of whether the probe noise signal is based on a white noise sequence.

As one obvious alternative the white noise sequence may be replaced by a coloured noise such as pink noise. According to another alternative the probe noise signal is not based on a spectrally shaped noise.

Other modifications and variations of the structures and procedures will be evident to those skilled in the art.

The invention claimed is:

1. A binaural hearing aid system comprising a first hearing aid and a second hearing aid, wherein each of the first and second hearing aids comprises:

an acoustical-electrical input transducer configured to receive an audio input signal and to output an input transducer output signal;

signal processing means configured to process a residual signal to generate a processed residual signal;

an electrical-acoustical output transducer configured to receive an output transducer input signal and to generate an audio output transducer output signal;

a probe noise generator configured to generate a probe noise signal;

an adaptive feedback estimator configured to receive the residual signal and the probe noise signal and to estimate, based thereon, an acoustic feedback path;

an adaptive acoustic feedback suppression filter configured to receive the output transducer input signal and to provide a feedback cancellation signal based on the estimated acoustic feedback path;

a first combiner, configured to combine the processed residual signal with the probe noise signal and providing the output transducer input signal;

a second combiner, configured to subtract the feedback cancellation signal from the input transducer output signal and hereby to generate the residual signal; and wherein the binaural hearing aid system further comprises:

a synchronization controller configured to synchronize the probe noise generator of the first hearing aid with the corresponding probe noise generator of the second hearing aid; and wherein the binaural hearing aid system further comprises a masking model generator configured to assist in providing a perceptually masked probe noise signal;

wherein the masking model generator generates a masking model output signal that is used to control the generation of the perceptually masked probe noise signal; and wherein the probe noise generator is configured to frequency shape a white-noise sequence based on the masking model output signal.

2. The system of claim 1, wherein the synchronization controller is configured to carry out the synchronization of the probe noise generators of the first and second hearing aids by using a wireless connection between the first and the second hearing aid of the binaural hearing aid system.

3. The system of claim 1, wherein the synchronization controller is configured to synchronize the probe noise generators such that a mistiming between the generated probe noise signals is less than 300 microseconds or less than 150 microseconds.

4. The system of claim 1, wherein the probe noise generator is configured to generate the probe noise signal by adaptively frequency shaping a white noise sequence.

5. The system of claim 1, wherein the provided probe noise signals represent a diotic signal.

6. The system of claim 1, wherein the synchronization controller is configured to only synchronize the white noise sequence part of the probe noise signal.

7. A method of suppressing acoustic feedback in a binaural hearing aid system comprising a first hearing aid and a second hearing aid, the method comprising the following steps:

receiving, by an acoustical-electrical input transducer an audio input signal and providing an input transducer output signal;

processing a residual signal to generate a processed residual signal, wherein the residual signal is provided by subtracting a feedback cancellation signal from the input transducer output signal;

generating by an electrical-acoustical output transducer an acoustical output transducer output signal based on an output transducer input signal;

generating a probe noise signal;

estimating, by an adaptive feedback estimator, an acoustic feedback path based on the received residual signal and the probe noise signal;

combining, by a first combiner, the processed residual signal with the probe noise signal and hereby providing the output transducer input signal;

receiving, by an adaptive acoustic feedback suppression filter, the output transducer input signal and generating the feedback cancellation signal based on the estimated acoustic feedback path; and synchronizing, the probe noise signal of the first hearing aid with the probe noise signal of the second hearing aid;

wherein the generation of the probe noise signal frequency shapes a white-noise sequence based on a masking model output signal.

8. The method of claim 7, wherein the synchronization of the probe noise signals comprises a mistiming between the probe noise signals of less than 300 microseconds or less than 150 microseconds.

9. The method of claim 7, wherein the generation of the probe noise signals comprises adaptively frequency shaping the white noise sequence in order to provide a perceptually masked probe noise signal.

10. The method of claim 7, wherein the generation of the probe noise signals represent a diotic signal.

11. The method of claim 7, wherein the synchronization of the probe noise signals only comprises synchronization of the white noise sequence part of the probe noise signals.

12. A non-transitory computer-readable medium comprising instructions which, when executed by a computer, cause the computer to carry out the steps of the method of claim 10.

* * * * *